United States Patent [19]
Allen

[11] 4,442,540
[45] Apr. 10, 1984

[54] DATA OVER VOICE TRANSMISSION ARRANGEMENT

[75] Inventor: Jonathan B. Allen, Westfield, N.J.

[73] Assignee: Bell Telephone Laboratories, Incorporated, Murray Hill, N.J.

[21] Appl. No.: 270,543

[22] Filed: Jun. 4, 1981

[51] Int. Cl.³ .............................................. G10L 1/00
[52] U.S. Cl. .................................... 381/31; 370/69.1; 179/84 VF
[58] Field of Search ..................... 179/1.5 A, 15.55 R, 179/15.55 T, 1 D, 84 VF; 370/50, 81, 69, 69.1, 76; 358/142, 143, 257; 360/20; 381/31; 375/122

[56] References Cited

U.S. PATENT DOCUMENTS

| | | | |
|---|---|---|---|
| 2,541,932 | 2/1951 | Melhose | 370/81 |
| 2,870,260 | 1/1959 | Guenther | 370/81 |
| 3,158,693 | 11/1964 | Flanagan | 179/15.55 |
| 3,360,610 | 12/1967 | Flanagan | 179/15.55 |
| 3,399,278 | 8/1968 | Dahlman | 370/50 |
| 3,586,781 | 6/1971 | Jones | 370/69.1 |
| 3,718,767 | 2/1973 | Ellis | 370/76 |
| 4,071,707 | 1/1978 | Graf | 179/15.55 R |
| 4,117,541 | 9/1978 | Ali | 370/50 |
| 4,131,765 | 12/1978 | Kahn | 179/15.55 R |
| 4,229,622 | 10/1980 | Cochrane | 370/81 |

*Primary Examiner*—E. S. Matt Kemeny
*Attorney, Agent, or Firm*—J. P. Kearns

[57] ABSTRACT

A system for interpolating digital data signals to a frequency band above analog speech signals in a common transmission channel is disclosed. The system utilizes short time frequency analysis techniques to determine the cutoff frequency of the speech signal. Data signals temporarily held in storage within the system are thereafter modulated into an unused frequency band of the transmission channel above that needed for speech signals. The combined speech and data signals in the system are sent to a receiver which relays the respective speech and data signals to their appropriate locations. This system is compatible with digital signal processing techniques using Fast Fourier Transform Technology in conjunction with solid state logic elements.

6 Claims, 4 Drawing Figures

DATA OVER VOICE TRANSMISSION ARRANGEMENT

CROSS REFERENCE TO RELATED APPLICATIONS

Filed concurrently with and related to the present application is application Ser. No. 270,542 by J. B. Allen.

TECHNICAL FIELD

This invention relates to apparatus and method for interleaving of speech and data signals.

BACKGROUND OF THE INVENTION

In attempting to make more economical use of transmission facilities, a number of arrangements have been devised to reduce the amount of bandwidth necessary to transmit speech or data information.

One approach to bandwidth reduction is to use the silent intervals that separate energy bursts in normal speech sound. In prior art systems embodying this approach, additional information, usually speech, is interpolated into these silent intervals so that a greater amount of information may be carried by a given amount of frequency bandwidth. Three examples of systems for reducing transmission channel bandwidth by speech interpolation appear in A. E. Melhose, U.S. Pat. No. 2,541,932, issued Sept. 13, 1951; R. Guenther, U.S. Pat. No. 2,870,260, issued Jan. 20, 1959; and J. L. Flanagan, U.S. Pat. No. 3,158,693, issued Nov. 24, 1964.

A feature common to the above-mentioned Guenther and Melhose patents is the interpolation of an energy burst from the voice signal of one talker into the time-coincident silent interval of the voice signal of another talker. In this way a given number of transmission channels between two points may accommodate a larger number of talkers. However, in the speech interpolation arrangement described by Melhose and Guenther, transmission channel economy is realized only during those perios where the number of talkers exceeds the number of transmission channels. For only in such periods does the use of silent intervals become necessary.

Flanagan, on the other hand, accomplishes bandwidth reduction by arbitrarily dividing bursts of speech energy into high and low frequency bands and translating one or both of the segments to the frequency range accommodated by a reduced bandwidth transmission channel. The low band segment is transmitted directly from a transmitting channel over the reduced bandwidth channel. Meanwhile, the high band segment is delayed for the duration of its own energy burst, and at the end of that energy burst, when all of the low band energy will have been transmitted, the transmission of the delayed high band energy can be accomplished during the next following silent interval in the low band of the same talker's speech signal. At the receiving terminal, the low band energy and the next following high band energy are adjusted in the time scale to bring the energies of both bands back into time coincidence. After translation of one or both of the now coincident bands to their original frequency ranges, the two bands are combined to construct a replica of the original energy burst of the voice signal.

P. Cochrane in U.S. Pat. No. 4,229,622, issued Oct. 21, 1980, teaches a method for transmitting a given number of speech signals over a smaller number of transmission channels which method comprises sensing a number of frequency subchannels within the frequency range of the speech channel and forming a composite signal from only those frequency subchannels that are active at any given interval. Thus, the transmission channel is occupied more completely. Then, the composite signal is transmitted with a coding signal to indicate how the composite signal was combined. This method requires band-switching of the frequency subchannels. Band-switching techniques limit and can sometimes totally destroy speech intelligibility.

All of the above-mentioned disclosures teach the interpolation of the speech signals of one talker into his or her own speech signal or that of another by various methods. However, none of these disclosures describe the interpolation of data signals over speech signals.

Methods have been employed in the prior art to interpolate data signals under voice signals. These techniques utilize the 0 to 200 hertz frequency range where no speech signal is normally transmitted on telephone channels. The method uses, therefore, the total speech-free silent interval of the 0 to 200 hertz range in which to transmit data signals. Effectively data and speech signals are frequency multiplexed in dedicated low and high frequency bands. Therefore, data are being transmitted simultaneously and continuously with the speech signal, unlike Flanagan, Guenther, and Melhose who transmit high-band speech energy only during silent intervals of low-band speech energy.

It is an object of this invention to interpolate data signals at frequencies above speech signals in a transmission channel.

It is a further object of this invention to use the full frequency transmission bandwidth to transmit data and voice signals over the same transmission channel.

This invention combines time and frequency interpolation to utilize both silent intervals and unused frequencies in a speech signal to transmit digital data. This invention avoids the use of band-switching techniques, thereby maximizing speech intelligibility.

SUMMARY OF THE INVENTION

According to this invention, speech and data signals are transmitted simultaneously. This embodiment comprises circuitry for converting the analog speech signal into digital form. The digitized speech thereafter is held in a buffer. From this buffer the speech signal is simultaneously sent to a real-time processor and to a delay buffer. The entire data signal on the other hand is initially held in another buffer. This data buffer signals the speech processor; and the latter, responsive to the speech signal, generates a cutoff frequency. The processor generates the cutoff frequency of a speech signal by utilizing short time frequency analysis techniques to determine a quantity of energy within a frame of speech. The energy content of the speech signal can be correlated with the frequency spectrum of the speech signal. Thereafter a certain percentage of the energy content is removed by the processor, and a corresponding determination is made as to how much of frequency bandwidth is unused. This determination also provides the cut-off frequency. This frequency is used to control a time-varying, complementary high-pass, low-pass filter and also to select simultaneously one modem among a plurality of modems to modulate the data signal into a frequency band above that of the speech signal. The data signal is then transmitted through the high-pass portion of the complementary high-pass, low-pass filter while the speech signal is simultaneously sent from the delay buffer through the low-pass portion of the filter. The identity of the cutoff frequency is sent at the top of the high band to allow the delayed signal to be recovered and reconstructed at the other end of the transmission path. The digital speech and data signals from the complementary high-pass, low-pass filter are then reconverted into an analog signal and sent to the receiver. The receiver converts the analog signal to digital and through the use of another complementary high-pass, low-pass filter sends the speech and data signals to their appropriate locations.

BRIEF DESCRIPTION OF THE DRAWING

The invention will be understood from the following detailed description when read with reference to the drawings in which.

DETAILED DESCRIPTION

Figure 1:
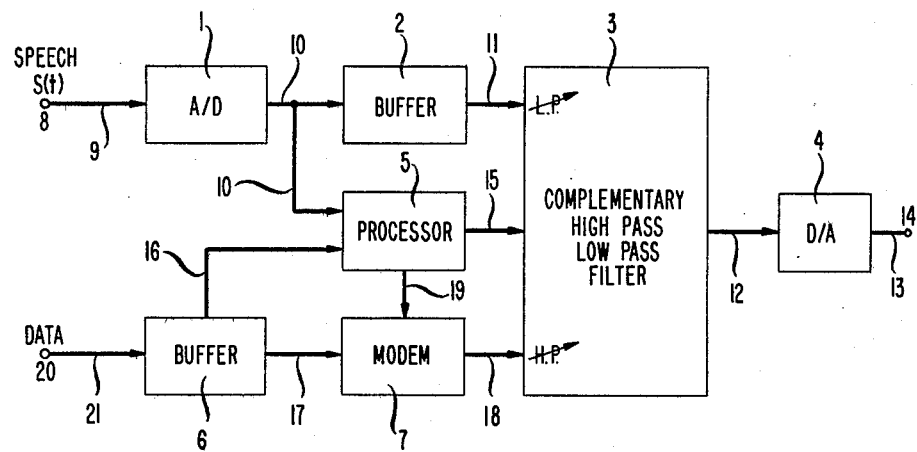
FIG. 1 is a generalized block diagram of the speech interpolation apparatus of this invention.

FIG. 1 discloses the speech interpolation apparatus of this invention in block diagram form. The apparatus comprises an analog-to-digital (A/D) converter 1 for changing the speech signal from analog to digital form; buffers 2 and 6 for holding the digital speech and data signals, respectively; processor 5 for generating control signals in response to both speech and data signals; modem 7 for modulating the data signal above the speech signal; time-varying complementary high-pass, low-pass (HP-LP) filter 3 for operating in response to control signals from processor 5 on speech and data signals, respectively, from buffer 2 and modem 7; and digital-to-analog (D/A) converter 4 for changing the digital speech and data signals into analog form with the speech signal in a lower segment of the channel bandwidth and with the data signal in an upper segment thereof.

In this embodiment speech input signal S(t) is applied via terminal 8 on lead 9 to the input of A/D 1 to convert the speech signal from analog form to digital. The output of A/D 1 is connected to the input of buffer 2 and processor 5 via data lead 10. Buffer 2 holds the digitized speech signal until processor 5 has had the requisite time to signal HP-LP filter 3 and modem 7. This buffer 2 will ensure an adequate delay to allow HP-LP 3 to be signaled by processor 5. A signal from buffer 6 via control lead 16 causes processor 5 to adjust modem 7 and HP-LP filter 3 via control leads 19 and 15, respectively, in response to the speech signal received from A/D 1. Data enters buffer 6 via terminal 20 and lead 21. Buffer 6 thereafter sends data to modem 7 via lead 17.

Buffers 2 and 6 typically are 256×16 bit chips, for example Model No. AM 2812, manufactured by Advanced Microproducts, Inc.

Modem 7 typically comprises a plurality of selectable submodems that have varying frequency bandwidths and positions in the voice frequency spectra. Processor 5 therefore selects the appropriate modem component dependent upon the cutoff frequency of the digitized speech signal it has generated. Modem 7 modulates the data signal via data lead 18 to the HP portion of complementary HP-LP filter 3, and at the same time delay buffer 2 sends the speech signal to the LP portion of HP-LP filter 3 via lead 11. The LP and HP portions of HP-LP filter 4 are complementary; therefore, the data signal is sent in an upper portion of the channel bandwidth above that of the speech signal. This time-varying filter could be implemented using techniques described by Oppenheim, Mecklenbraeuker, and Mersereau in their article "Variable Cutoff Linear Phase Digital Filters," published in *IEEE Transactions on Circuits and Systems* (Vol. CAS-23, No. 4, April 1976). This paper teaches a method for design digital filters for which the cut-off frequency is variable.

The total channel bandwidth utilized for speech transmission is typically 0 to 3.7 kilohertz. This combined signal (speech and data) is sent via data lead 12 to D/A 4, where it is converted into analog form and thereafter sent via data lead 13 to a receiver accessible to terminal 14.

At the receiver the speech and data signals are sent to an A/D converter and thereafter through a time-varying filter similar to the complementary high-pass low-pass filter 3. The data and voice signals are separated by the filter and sent to their appropriate locations.

This invention can be characterized as a variable frequency interpolation system in which not only silent intervals in the time domain are used to advantage but also where the speech signal occupies less than full bandwidth in the frequency domain data are inserted into momentarily unused and expandable frequency space above that needed for the speech signal alone.

The operation of this invention will become readily apparent to those skilled in the art after the more explicit explanation of the processor in the following discussion. As before mentioned, processor 5 of FIG. 1 determines the instantaneous cutoff frequency $f_c$ of the speech signal. This determination is accomplished through principles of speech analysis well known in art.

J. L. Flanagan in Part V of his book *Speech Analysis Synthesis and Perception* (Springer Verlag, New York 1972) teaches what he calls short-time frequency analysis of speech. Flanagan shows that the mathematical link between a periodic time function f(t) and its complex amplitude-density spectrum F(ω) is the Fourier transform-pair $$F(\omega) = \int_{-\infty}^{\infty} f(t)e^{-j\omega t} dt \tag{1}$$

and $$f(t) = \frac{1}{2\pi} \int_{-\infty}^{\infty} F(\omega)e^{j\omega t} d\omega \tag{2}$$

where ω is radian frequency and t is time.

To reflect significant temporal changes, the function F(ω) must be integrated over a time period reflecting quasi-steady elements of the speech signal. What is desired is a running spectrum, with a real time independent variable, and in which the spectral computation is made on weighted past values of the signals. This can be accomplished by analyzing a portion of the signal through a specified time window or weighting function.

This concept is used in analyzing the digital speech signal encountered in this invention. There are many different windows or weighting functions known to those skilled in art, the major requirement being that the product of the speech signal and the window is Fourier transformable.

Therefore, the Fourier transform for speech signal s(t) is $$S_n(\omega) = F\{s(t) \cdot w(t - nR)\}. \tag{3}$$

Where $S_n(\omega)$ is the weighted speech signal, F refers to Fourier transformation process; w is the weighting function; n is the indexed frame of speech; and R is the time period of the frame or decimation period. The weighting function or window w(t) represents the impulse response of some low pass filter. It is usually taken to be of finite time duration for convenience of use in digital implementations. Windows, such as rectangular or Hamming windows, are frequently used to frame the speech signal. For example, in many applications a frame period is taken to be 6 milliseconds with a window length of 24 milliseconds of speech.

By definition, the energy within a speech signal is proportional to the square of the amplitude of that signal.

We define the integrated energy for a frame of speech as $$\Gamma_n(x) = \int_x^\Omega |S_n(\omega)|^2 d\omega \tag{4}$$

where $\Omega$ is the maximum frequency and x represents the independent frequency variable. The integrated energy within the speech signal can be normalized by the following relation:

$$\gamma_n(x) = \frac{\int_x^\Omega |S_n(\omega)^2| d\omega}{\int_0^\Omega |S_n(\omega)^2| d\omega} = \frac{\Gamma_n(x)}{\Gamma_n(O)} \tag{5}$$

where $\gamma_n$ is the normalized integrated energy and $\Omega$ is the maximum radian frequency in the transmission channel.

This normalized integrated energy can be used to determine the frequency corresponding to a fixed fraction (or percentage) of the energy to be removed from each frame of speech.

It is well known to those skilled in the art that digitized signals can be summed to approximate the integration process. Thus, the above-mentioned equation 5 can be characterized in discrete form as:

$$\gamma_n(\omega_m) = \frac{\sum_{k=m}^{M} |S_n(\omega_k)|^2}{\sum_{k=1}^{M} |S_n(\omega_k)|^2} \tag{6}$$

where M is the number of spectral lines to be sampled in the speech signal, $\omega_m$ is the cutoff frequency in the nth frame of speech, and $\omega_1$ and $\omega_M$ are the minimum and maximum frequencies for any frame of speech.

Figure 2:
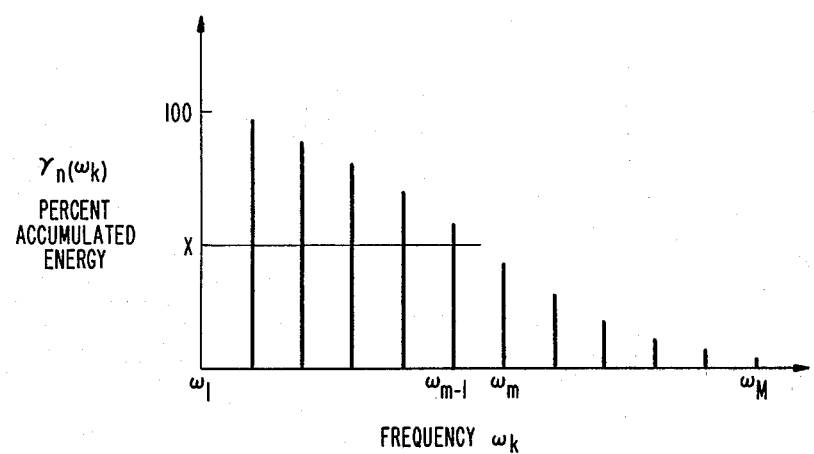

Thus referring to FIG. 2 whch is a graph of percent accumulated energy $\gamma(\omega_k)$ versus frequency $\omega_k$, $\gamma(\omega_m)$ represents the percentage of total energy above frequency $\omega_m$ while $\gamma_n(\omega_1) = 100$ percent. The general idea is to remove a certain percentage x of the energy in the speech signal and in so doing leave unoccupied space into which data can be inserted in the transmission channel.

Figure 3:
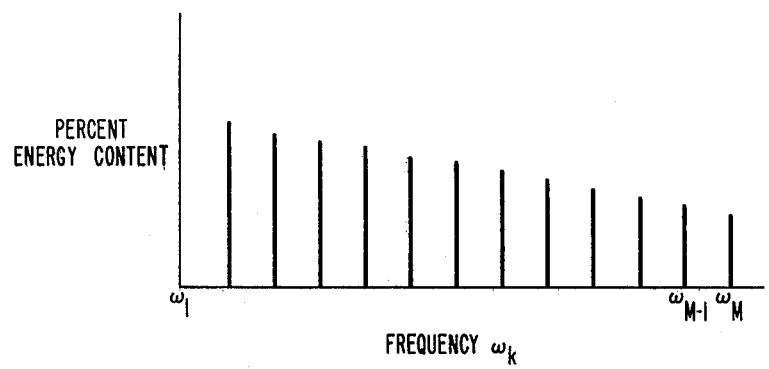
FIGS. 2 and 3 are representations of the frequency components of a speech signal.

The removal of a certain percentage of the energy is accomplished by normalizing the energy coefficients of each spectral line by the total energy for the frame and thereafter obtaining a percentage of total energy for each spectral line. Individual spectral energy lines are accumulated starting at $\omega_M$, the highest frequency, until they reach the percentage of energy to be removed. Associated with each spectral line is a frequency; thus, when the desired percentage of energy is reached, then the frequency associated with that particular percentage of energy is known. FIG. 3 is a graph of percent spectral energy versus frequency $\omega_k$. Each of the vertical lines in the Figure represents the spectral energy as a function of frequency. Thus, the total spectral energy can be seen to be the accumulation of the energy content of FIG. 3 as shown in FIG. 2.

If the intent is to remove x percentage of spectral energy, then the procedure is the following. First determine the percentage energy content of the speech signal when the frequency is $\omega_M$. Since, in this example, it is less than x percent of the total energy, the percentage energy content of the next spectral line at $\omega_{M-1}$ is added to the energy content at $\omega_M$. This sum is still less than the x percentage value. This process is continued until the desired percentage is reached. In FIG. 2 the desired percentage x is bounded between frequency $\omega_{m-1}$ and $\omega_m$. Thus, in this example the cutoff frequency would be $\omega_m$ because it is the frequency at which the energy content is nearest the percentage of energy that is to be removed from the speech. This cutoff frequency produced in the processor 7 of FIG. 1, as before mentioned, is used to signal a bank of modems and a time-varying, complementary, high-pass, low-pass filter for the data and speech signal, respectively.

This invention takes advantage of the experimental observation that over intervals of time, on the average, only one-half the bandwidth of a transmission channel is being used for speech and that with a removal of only one percent of the energy from the speech signal, the use of one-half the channel bandwidth is a virtual certainty without significant degradation of the speech.

Figure 4:
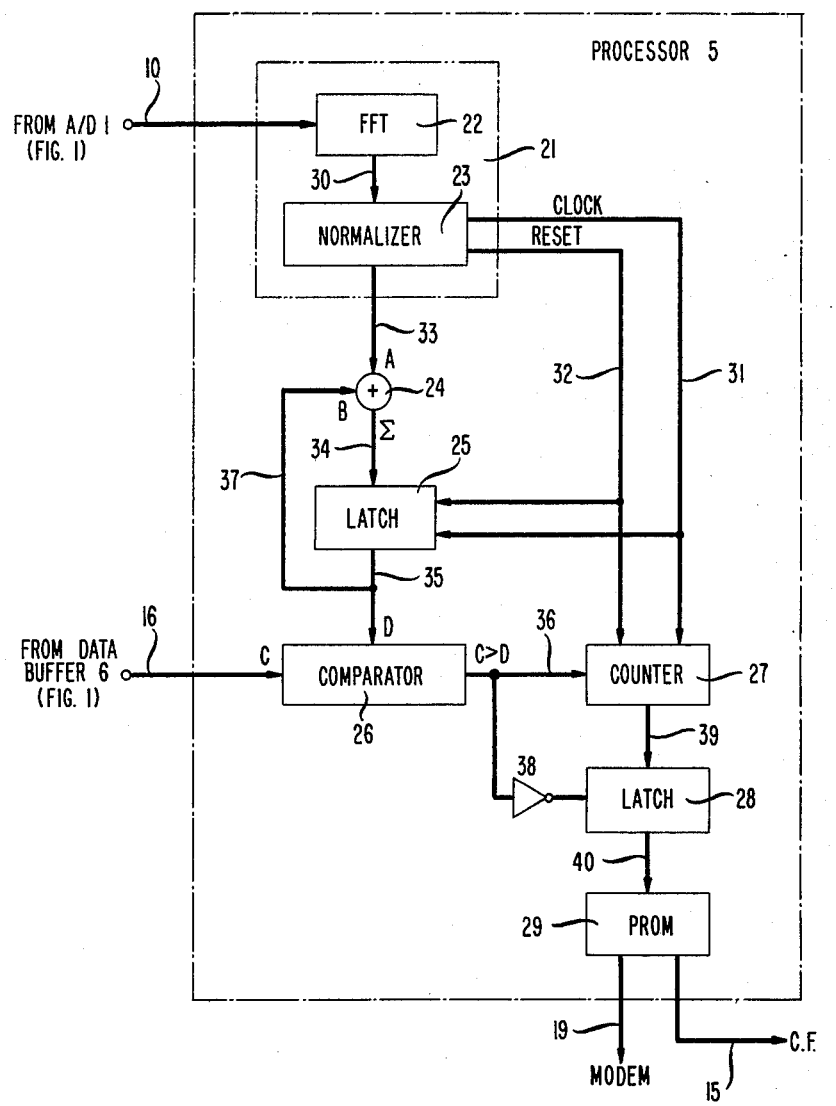
FIG. 4 is a detailed block diagram of a processor useful in the practice of this invention.

FIG. 4 is a detailed block diagram of processor 6 of FIG. 1. This embodiment comprises Fast Fourier Transform (FFT) circuit 21, adder 24, latch 25, comparator 26, counter 27, latch 28, and programmable read only memory (PROM) 29. FFT circuit 21 having an input on line 10 further comprises FFT 22 and normalizer 23. FFT circuit 21 determines the normalized energy for each spectral line of speech. In this embodiment for each 30 msec frame of speech there are 256 spectral lines. The weighting function or window is determined within FFT 22 to properly frame the speech. Thereafter each of those spectral lines is normalized by the total energy within the frame of speech by normalizer circuit 23. Adder 24 accumulates the normalized energy from output 30 of FFT circuit 21. Latch 24 stores the accumulated normalized energy. Comparator 20 determines whether the accumulated normalized energy is at the appropriate level. Counter 27 counts the number of spectral lines from which energy is accumulated. Latch 28 inputs the count from counter 27 to PROM 29. PROM 29 converts the counts into frequencies.

In this embodiment the speech signal enters FFT 22 from the analog to digital converter of FIG. 1 via lead 10. FFT 22 can be weighted with an assortment of windows, and the total energy can be calculated as taught by J. L. Lehmann et al. in their U.S. Pat. No 3,881,097, issued Apr. 27, 1975. Lehmann et al. disclose means for obtaining power values for spectral lines from a series of digital numbers using Fast Fourier Transform techniques.

This energy within each spectral line of the digital speech signal is sent to normalizer 23 via data lead 30. Normalizer 23 determines the total energy within the frame of speech and divides that total energy into the energy content of each spectral line to obtain a percentage. Normalizer 23 also provides clock and clear signals for latch 25 and counter 27 via control leads 31 and 32, respectively.

A. Nakajima et al. in their U.S. Pat. No. 4,227,246 teach a normalizer circuit in which a predetermined boundary or input speech is analyzed to extract a spectrum of information in the boundary. This disclosure need only be modified to provide a clock and reset pulses to counter 27 and latch 25 to be adapted to the present embodiment.

Normalizer 23 successively supplies to adder 24 the percentage of the total energy represented by each spectral line. For example, if the frequency bandwidth of the transmission channel is 3.7 KHz, then initially the percentage within the 3.7 KHz frequency is sent from normalizer 23 to input A of adder 24 via data lead 33. The adder 24 thereafter sends the data from the E output to latch 25 via data lead 34. Subsequently, normalizer 23 clocks latch 25 to send the data to comparator 26 via lead 35 and simultaneously clocks counter 27 to count one time interval via control lead 31. Also the output of latch 25 is fed back to adder 24 to input B via data lead 37. Comparator 26 receives the percentage at input D and compares this percentage of energy to a predetermined percentage received from the data buffer at input C of FIG. 1 via lead 16. If the signal on lead 36 indicates that signal C is greater than signal D, then counter 27 is enabled.

Thereupon normalizer 23 sends the percentage of energy in the next spectral line to adder 24 to input A via data lead 33 and simultaneously clocks latch 25 and counter 27. This percentage is added to the feedback percentage received from latch 25 at input B. These percentages are summed and sent to latch 25; latch 25 subsequently sends the data to the D input comparator 26 and the B input of adder 24. Comparator 26 once again compares the output of latch 35 (which is now the sum of the percentage of energy within the two spectral lines) at input D and the predetermined percentage received from the data buffer of FIG. 1 at input C. Once again, if C exceeds D, then counter 27 remains enabled and the normalizer starts the cycle again. If D exceeds C, however, line 36 changes state and disables counter 27, simultaneously causing latch 28 to load the number of counts by way of inverter 38 received from counter 27 via lead 39 into the PROM 29 via lead 40. This number of counts represents the number of spectral lines necessary to obtain the desired percentage of energy to be removed for a frame of speech. Those skilled in the art recognize that associated with each spectral line is a certain frequency. In this embodiment, therefore, the PROM 29 determines the mapping between the number of counts and frequency. PROM 29 then signals the appropriate submodem to modulate the data signal above the cutoff frequency of the speech signal over lead 19 and also signals the time-varying HP-LP filter over lead 15 such that the digitized speech and data signals are properly assigned to their appropriate bandwidths. On the average, up to one-half of the frequency bandwidth (approximately 1.8 KHz) is unused during normal speech. This technique allows a substantial amount of data to be inserted above the speech signal while minimally degrading the speech signal on the order of one percent.

In this illustrative embodiment, adder 24, latches 25 and 28, counter 27, comparator 26, and PROM 29 are fully realizable in TTL circuit technology. Typically, adder 24 can be implemented by Model No. 745301, latches 26 and 28 by Model No. 74273, comparator by Model No. 7485, counter 27 by Model No. 74163, and PROM 29 by Model No. 74471, all by Texas Instruments.

While this invention has been disclosed by means of a specific illustrative embodiment, the principles thereof are capable of a wide range of modification by those skilled in art within the scope of the following claims.

What is claimed is:

1. A method for interpolating data and speech signals into a common transmission band comprising the steps of:
    (a) converting the speech signal from analog to digital form,
    (b) determining a frequency spectrum of the digital speech signal,
    (c) determining a total energy content of the digital speech signal,
    (d) determining the actual percentage of the total energy within each spectral line,
    (e) summing the actual percentages of energy within a number of spectral lines,
    (f) comparing the summed actual percentages of energy to the total energy content of the speech signal until a predetermined percentage is reached,
    (g) determining the cutoff frequency of the digital speech signal when the predetermined percentage is reached,
    (h) modulating the data signal to a position above the cutoff frequency of the speech signal, and
    (i) sending the speech and modulated data signal to a receiver.

2. A system for interpolating digital data and analog speech signals into a common transmission band comprising
    a first buffering means for holding digital data signals,
    means for converting speech signals into digital form,
    a second buffering means for holding digital speech signals received from the converting means,
    processing means for determining the cutoff frequency of speech signals in response the first and second buffering means,
    the processing means further comprising,
    discrete Fourier transform means for determining the frequency spectrum of the digitized speech signal,
    normalization means for determining the total energy of the frequency spectrum of the discrete Fourier transform means and for determining the actual percentage of energy within each spectral line of the speech signal,
    summing means for accumulating the actual percentage of energy within each spectral line,
    first latching register means for storing the accumulation of the actual percentage of energy within each spectral line and for feeding the actual percentage back to the summing means, and
    comparator means for receiving the actual percentage of energy from the first register means and comparing it with a predetermined percentage from the second buffer means, counting means for receiving the number of counts corresponding to the number of spectral lines from the normalization means, second latching register means for receiving the number of counts corresponding to the number of spectral lines from the counting means, read only memory means for converting the number of spectral lines from the second latching register means to the cutoff frequency of the speech signal, the comparator means signaling a counting means when the actual percentage is smaller than the predetermined percentage, the comparator means further inhibiting the counting means and signaling the second latching register means when the actual percentage is larger than the predetermined percentage, the second register means sends the number of counts corresponding to the number of spectral lines obtained by accumulating the energy in the summing means to the read-only memory means, modem means responsive to the cutoff frequency determined by the processing means for translating the data signals to a position in the transmission band above the cutoff frequency, and filtering means responsive to the processing means for assigning the speech and the translated data signals within said transmission band respectively below and above the cutoff frequency.

3. A method for interpolating digital data and analog speech signals into a common transmission band comprising the steps of, holding the digital data signal, converting the analog speech signal into digital form, determining the frequency spectrum of the digitized speech signal, determining the total energy within the frequency spectrum, determining the actual percentage of energy within each spectral line, summing the actual percentage of energy within each spectral line in sequence, comparing the summed actual percentage energy with a predetermined percentage of energy in sequence, receiving a number of counts corresponding to the number of spectral lines in sequence, converting the number of spectral lines to the cutoff frequency of the digitized speech signal when the predetermined percentage of energy is reached, translating the digital signal to a position above the cutoff frequency of the digital speech signal, and sending the digitized speech signal and the translated data signal to a receiver.

4. A system for interpolating digital data and analog speech signals into a common transmission band comprising:

a first buffering means for holding digital data signals, means for converting speech signals into digital form, a second buffering means for holding digital speech signals received from the converting means, and processing means for determining the cutoff frequency of speech signals in response to the first and second buffering means;

said processing means further comprising discrete Fourier transform means for determining the frequency spectrum of the digitized speech signal, normalization means for determining the total energy of the frequency spectrum of the discrete Fourier of energy within each spectral line of the speech signal, summing means for accumulating the actual percentage of energy within each spectral line, first latching register means for storing the accumulation of the actual percentage of energy within each spectral line and for feeding the actual percentage back to the summing means, comparator means for receiving the actual percentage of energy from the first register means and comparing it with a predetermined percentage from the second buffer means, counting means for receiving the number of counts corresponding to the number of spectral lines from the normalization means, second latching register means for receiving the number of counts corresponding to the number of spectral lines from the counting means, read-only memory means for converting the number of spectral lines from the second latching register means to the cutoff frequency of the speech signal, the comparator means signaling a counting means when the actual percentage is smaller than the predetermined percentage;

said comparator means further inhibiting the counting means and signaling the second latching register means when the actual percentage is larger than the predetermined percentage, the second register means sends the number of counts corresponding to the number of spectral lines obtained by accumulating the energy in the summing means to the read-only memory means, modem means responsive to the cutoff frequency determined by the processing means for translating the data signals to a position in the transmission band above the cutoff frequency, and the modem means further comprising a plurality of submodems, each submodem being associated with a discrete cutoff frequency, and filtering means responsive to the processing means for assigning the speech and the translated data signals within said transmission band respectively below and above the cutoff frequency.

5. A system for interpolating digital data and analog speech signals into a common transmission band comprising:

a first buffering means for holding digital data signals, means for converting speech signals into digital form, a second buffering means for holding digital speech signals received from the converting means, and processing means for determining the cutoff frequency of speech signals in response to the first and second buffering means;

the processing means further comprising discrete Fourier transform means for determining the frequency spectrum of the digitized speech signal, normalization means for determining the total energy of the frequency spectrum of the discrete Fourier transform means and for determining the actual percentage of energy within each spectral line of the speech signal, summing means for accumulating the actual percentage of energy within each spectral line, first latching register means for storing the accumulation of the actual percentage of energy within each spectral line and for feeding the actual percentage back to the summing means, comparator means for receiving the actual percentage of energy from the first register means and comparing it with a predetermined percentage from the second buffer means, counting means for receiving the number of counts corresponding to the number of spectral lines from the normalization means, second latching register means for receiving the number of counts corresponding to the number of spectral lines from the counting means, read-only memory means for converting the number of spectral lines from the second latching register means, to the cutoff frequency of the speech signal, the comparator means signaling a counting means when the actual percentage is smaller than the predetermined percentage, the comparative means further inhibiting the counting means and signaling the second latching register means when the actual percentage is larger than the predetermined percentage, the second register means sends the number of counts corresponding to the number of spectral lines obtained by accumulating the energy in the summing means to the read-only memory means, modem means responsive to the cutoff frequency determined by the processing means for translating the data signals to a position in the transmission band above the cutoff frequency, and filtering means responsive to the processing means for assigning the speech and the translated data signals within said transmission band respectively below and above the cutoff frequency;

the filtering means further comprising, a complementary pair of time varying high-pass, low-pass filters, the high-pass portion of the filtering means operating on the data signal from said modem means and the low-pass portion of the filter operating on the speech signal from the second buffering means.

6. A system for interpolating digital data and analog speech signals into a common transmission band comprising:

a first buffering means for holding digital data signals, means for converting speech signals into digital form, a second buffering means for holding digital speech signals received from the converting means, processing means for determining the cutoff frequency in response to the first and second buffering means;

said processing means further comprising, discrete Fourier transform means for determining the frequency spectrum of the digitized speech signal, normalization means for determining the total energy of the frequency spectrum of the discrete Fourier transform means and for determining the actual percentage of energy within each spectral line of the speech signal, summing means for accumulating the actual percentage of energy within each spectral line, first latching register means for storing the accumulation of the actual percentage of energy within each spectral line and for feeding the actual percentage back to the summing means, comparator means for receiving the actual percentage of energy from the first register means and comparing it with a predetermined percentage from the second buffer means, counting means for receiving the number of counts corresponding to the number of spectral lines from the normalization means, second latching register means for receiving the number of counts corresponding to the number of spectral lines from the counting means, read-only memory means for converting the number of spectral lines from the second latching register means, to the cutoff frequency of the speech signal, the comparator means signaling a counting means when the actual percentage is smaller than the predetermined percentage, the comparator means further inhibiting the counting means and signaling the second latching register means when the actual percentage is larger than the predetermined percentage, the second register means sends the number of counts corresponding to the number of spectral lines obtained by accumulating the energy in the summing means to the read-only memory means, modem means responsive to the cutoff frequency determined by the processing means for translating the data signals to a position in the transmission band above the cutoff frequency;

said modem means further comprising a plurality of submodems, each submodem being associated with a discrete cutoff frequency, and fittering means respnsive to the processing means for assigning the speech and the translated data signals within said transmission band respectively below and above the cutoff frequency;

the filtering means further comprising a complementary pair of time-varying, high-pass, low-pass filters;

the high-pass portion of the filtering means operating on the data signal from said modem means and the speech signal from the second buffering means.

* * * * *